(12) United States Patent
Eveson et al.

(10) Patent No.: US 11,091,581 B2
(45) Date of Patent: Aug. 17, 2021

(54) COATED POLYESTER FILMS

(71) Applicant: DUPONT TEIJIN FILMS U.S. LIMITED PARTNERSHIP, Chester, VA (US)

(72) Inventors: Robert Eveson, Yarm Cleveland (GB); Robert Hutchings, Middlesbrough Cleveland (GB)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 311 days.

(21) Appl. No.: 15/312,412

(22) PCT Filed: May 21, 2015

(86) PCT No.: PCT/GB2015/051497
§ 371 (c)(1),
(2) Date: Nov. 18, 2016

(87) PCT Pub. No.: WO2015/177558
PCT Pub. Date: Nov. 26, 2015

(65) Prior Publication Data
US 2017/0081488 A1    Mar. 23, 2017

(30) Foreign Application Priority Data
May 21, 2014   (GB) .................................... 1409063

(51) Int. Cl.
*C08G 18/08*   (2006.01)
*C08G 18/44*   (2006.01)
(Continued)

(52) U.S. Cl.
CPC ......... *C08G 18/0866* (2013.01); *B05D 3/108* (2013.01); *C08G 18/44* (2013.01);
(Continued)

(58) Field of Classification Search
None
See application file for complete search history.

(56) References Cited

U.S. PATENT DOCUMENTS 3,862,261 A * 1/1975 Stoddard ................ C08J 7/0427
                                                      428/412
5,415,942 A    5/1995 Anderson
(Continued)

FOREIGN PATENT DOCUMENTS

JP    2008209681 A      9/2008
JP    2010-285591 A  * 12/2010
(Continued)

OTHER PUBLICATIONS

International Search Report and Written Opinion of the International Searching Authority for PCT/GB2015/051497, European Patent Office, dated Oct. 20, 2015, pp. 1-17.
(Continued)

*Primary Examiner* — Vivian Chen

(57) ABSTRACT

Polyester films with abrasion resistant coatings and methods for making the same are provided. The coated polyester films include a polyester film substrate having a coating on at least one side thereof, wherein the coating is derived from a coating composition that includes (i) a melamine cross-linker component and (ii) a polyurethane component derivable from at least one diisocyanate and at least one polymeric polyol.

28 Claims, 1 Drawing Sheet

(51) Int. Cl.
| | |
|---|---|
| *C08J 7/04* | (2020.01) |
| *C08J 7/043* | (2020.01) |
| *C08J 7/046* | (2020.01) |
| *B05D 3/10* | (2006.01) |
| *C08G 18/83* | (2006.01) |
| *C09D 175/06* | (2006.01) |
| *C09D 175/08* | (2006.01) |
| *C09D 161/28* | (2006.01) |
| *C08L 75/06* | (2006.01) |
| *C08L 75/04* | (2006.01) |
| *C08L 75/08* | (2006.01) |
| *C08G 18/73* | (2006.01) |
| *C08G 12/26* | (2006.01) |
| *C08G 12/38* | (2006.01) |
| *C08G 12/32* | (2006.01) |
| *C08G 18/72* | (2006.01) |
| *C08G 18/32* | (2006.01) |
| *C08G 18/70* | (2006.01) |
| *C08G 18/76* | (2006.01) |
| *C08G 18/80* | (2006.01) |

(52) U.S. Cl.
CPC ............ *C08G 18/833* (2013.01); *C08J 7/043* (2020.01); *C08J 7/046* (2020.01); *C08J 7/0427* (2020.01); C08G 12/26 (2013.01); C08G 12/266 (2013.01); C08G 12/32 (2013.01); C08G 12/38 (2013.01); C08G 18/32 (2013.01); C08G 18/3203 (2013.01); C08G 18/70 (2013.01); C08G 18/72 (2013.01); C08G 18/73 (2013.01); C08G 18/76 (2013.01); C08G 18/80 (2013.01); C08G 18/83 (2013.01); C08J 2367/02 (2013.01); C08J 2475/04 (2013.01); C08L 75/04 (2013.01); C08L 75/06 (2013.01); C08L 75/08 (2013.01); C08L 2203/20 (2013.01); C08L 2312/00 (2013.01); C09D 161/28 (2013.01); C09D 175/06 (2013.01); C09D 175/08 (2013.01); Y10T 428/31565 (2015.04); Y10T 428/31786 (2015.04); Y10T 428/31942 (2015.04)

(56) References Cited

U.S. PATENT DOCUMENTS

| | | | |
|---|---|---|---|
| 6,660,397 B2 | 12/2003 | Fitch et al. | |
| 7,005,176 B2* | 2/2006 | Tojo | B32B 17/10018 428/141 |
| 7,019,070 B2* | 3/2006 | Chung | C08G 18/0823 428/423.1 |
| 2002/0001723 A1* | 1/2002 | Fuchs | B32B 27/40 428/424.4 |
| 2002/0146518 A1* | 10/2002 | Kusume | B32B 27/36 428/1.33 |
| 2003/0235704 A1* | 12/2003 | Akatsu | C08J 7/047 428/482 |
| 2006/0127666 A1* | 6/2006 | Fuchs | C09J 7/29 428/343 |
| 2006/0210768 A1* | 9/2006 | Masuda | B29C 33/68 428/141 |
| 2008/0032144 A1* | 2/2008 | Hashimoto | H05K 1/0326 428/480 |
| 2010/0215902 A1* | 8/2010 | Kiehne | B32B 17/10018 428/141 |
| 2011/0117339 A1* | 5/2011 | Baek | B29C 55/143 428/213 |
| 2011/0189489 A1* | 8/2011 | Kawasaki | C08J 7/042 428/423.7 |
| 2012/0094113 A1* | 4/2012 | Kawasaki | B32B 27/36 428/336 |
| 2012/0121918 A1* | 5/2012 | Kawasaki | C09D 175/06 428/480 |
| 2012/0128986 A1* | 5/2012 | Kawasaki | C08J 7/047 428/413 |
| 2012/0189831 A1* | 7/2012 | Kawasaki | G02B 1/14 428/216 |
| 2012/0189855 A1* | 7/2012 | Isaki | B32B 27/36 428/423.7 |
| 2012/0269974 A1* | 10/2012 | Arzt | C08G 18/0823 427/358 |
| 2013/0078471 A1 | 3/2013 | Hiraki | |
| 2013/0337267 A1* | 12/2013 | Funatsu | G02B 1/105 428/412 |
| 2014/0302241 A1* | 10/2014 | Lin | C08G 12/32 427/388.3 |
| 2015/0064457 A1* | 3/2015 | Chen | C09D 161/20 428/337 |
| 2016/0032135 A1 | 2/2016 | Sato et al. | |

FOREIGN PATENT DOCUMENTS

| | | | |
|---|---|---|---|
| JP | 2013-199045 A | * | 10/2013 |
| JP | 2014041244 A | | 3/2014 |
| KR | 2005-0032161 A | * | 4/2005 |
| KR | 2013-0001463 A | * | 1/2013 |
| WO | 2013125288 A1 | | 8/2013 |

OTHER PUBLICATIONS

International Preliminary Report on Patentabiliby for PCT/GB2015/051497, European Patent Office, dated Aug. 2, 2016, pp. 1-15.
Japanese Office Action for Japanese Application No. 2016-567917, dated Apr. 4, 2019, with translation, 6 pages.

* cited by examiner

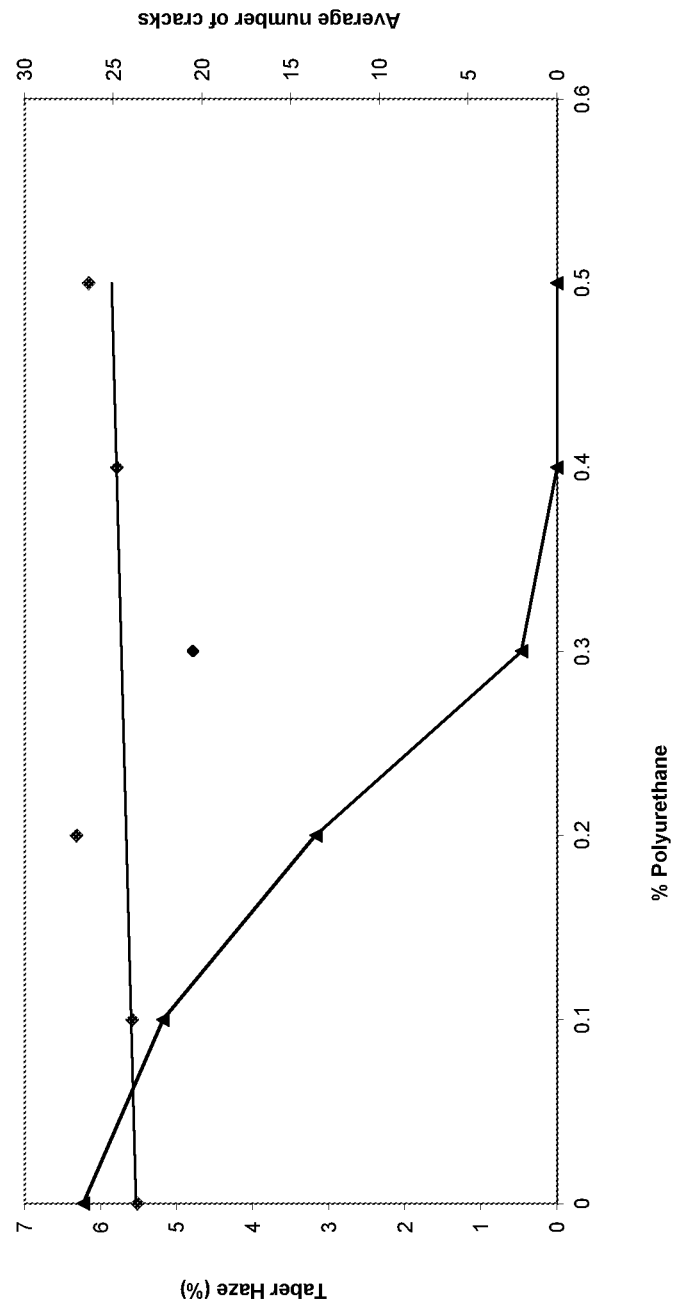

COATED POLYESTER FILMS

This application is a National Phase filing of International Application No. PCT/GB2015/051497, filed 21 May 2015, and claims priority benefit of GB Application No. 1409063.3, filed 21 May 2014, the entirety of which applications is incorporated herein by reference for all purposes.

FIELD OF THE INVENTION

This application relates to polyester films provided with abrasion resistant coatings. In particular, the application relates to polyester films provided with abrasion resistant coatings having improved flexibility.

BACKGROUND OF THE INVENTION

The advantageous mechanical properties, dimensional stability and optical properties of polyester films are well-known and have many areas of application. Many adaptations of polyester films have been proposed in order to tailor the properties of a polyester film to a particular application. However, it is often found that an adaptation which improves the performance of a polyester film in one respect may be detrimental to the performance of the film in another respect. For instance, a modification which aims to improve the mechanical properties of a film may have a negative consequence for the optical properties of the film. Accordingly, it is often difficult to obtain polyester films having a suitable combination of desirable properties.

In order to improve the performance of polyester films, it is known to provide coatings on one or both surfaces of the film. Such coatings may be used to improve various film qualities, such as adhesiveness, smoothness, permeability, printability, abrasion resistance and light transmission. Coatings that improve the resistance of a film to surface abrasion have many applications but are particularly useful for applications in which a high level of film transparency is desired, since surface scratches increase the haziness of a film. Examples of such applications include graphic displays, particularly touch panel graphic displays, protective films for touch panel displays, window films, packaging and laminate furniture. Abrasion resistant coatings are also useful in applications where subsequent modifications of the film in sheet or roll to roll processing may lead to scratching of the film surface.

It is known that polyester films may be provided with a highly crosslinked coating in an off-line coating process so as to improve abrasion resistance. For instance, U.S. Pat. No. 5,415,942 discloses an abrasion resistant coating for a polyester film which is obtained by applying a cross-linked acrylic based primer composition to the polyester film and an overlying coating of a polysiloxane. U.S. Pat. No. 6,660,397 discloses an abrasion resistant coating for a polyester film which is obtained by applying a highly crosslinked melamine-formaldehyde resin coating to a film by an in-line process.

The hardened surface coatings obtained by such methods can provide excellent levels of abrasion resistance; however, this is obtained at the expense of other properties of the film. In particular, it has been found that known coating processes to improve abrasion resistance result in coated films that have poor flexibility. Manipulation of the film, for instance by winding or bending can lead to cracking and delamination of the coating resulting in a loss of structural integrity and impairment to the optical properties of the film. In addition, flexible substrates exhibiting high abrasion resistance are desirable for use in the applications noted above, in particular in the provision of protective films for flexible displays and laminate furniture.

SUMMARY OF THE INVENTION

It is therefore an aim of the present invention to provide coated polyester films in which abrasion resistance is obtained alongside other desirable film properties, in particular while maintaining good levels of flexibility—defined herein as the resistance of the coating to cracking and/or delamination on upon application of a strain and/or bending force to the coated polyester film.

It is a further aim of the present invention to provide a method for the production of such coated polyester films, in particular a method in which the coating composition can be applied in-line during manufacture of the polyester film.

According to a first aspect of the present invention, there is provided a coated polyester film comprising a polyester film substrate and a coating on at least one side of the polyester film substrate, wherein the coating is derived from a coating composition comprising: (i) a melamine crosslinker component; and (ii) a polyurethane component derivable from at least one diisocyanate and at least one polymeric polyol.

BRIEF DESCRIPTION OF THE DRAWINGS

FIG. 1 shows the effect of coating composition polyurethane content on Taber haze in a coated PET film and on the average number of cracks after 25% elongation of the film.

DETAILED DESCRIPTION OF THE INVENTION

The present inventors have found that the inclusion of a polyurethane component (ii) as defined above into a cross-linked melamine coating enables a significant improvement to be obtained in the flexibility of the coated polyester films of the invention, with little or no detriment to the resistance of the coating to abrasion.

The melamine crosslinker component (i) and the polyurethane component (ii) taken together preferably constitute at least 80% by weight of the solids in the coating composition, preferably at least 90% by weight of the solids in the coating composition, at least 95% by weight of the solids in the coating composition, at least 98% by weight of the solids in the coating composition, or at least 99% by weight of the solids in the coating composition. The solids in the coating may consist essentially of the melamine crosslinker component (i) and the polyurethane component (ii).

The weight ratio of the polyurethane component (ii) relative to the melamine crosslinker component (i) is preferably in the range of from 1% to 300%, more preferably from 5% to 200%, more preferably from 10% to 100%, more preferably from 15% to 75% and most preferably from 20% to 50%.

For example, the weight ratio of the polyurethane component (ii) relative to the melamine crosslinker component (i) may be in the range of 1% to 160%, more preferably 1% to 150%, more preferably 1% to 140%, more preferably 1% to 130%, more preferably 1% to 120%, more preferably 1% to 110%, more preferably 1% to 100%, more preferably 5% to 100%, more preferably 10% to 90%, more preferably 15% to 75% or most preferably 20% to 50%. The polyester film is a self-supporting film or sheet by which is meant a film or sheet capable of independent existence in the absence of a supporting base. Preferably, the polyester film is a biaxially oriented polyester film.

The term polyester as used herein refers to a polyester or copolyester derived from one or more diols, one or more aromatic dicarboxylic acids and optionally one or more aliphatic dicarboxylic acids having the general formula $C_nH_{2n}(CO_2H)_2$, wherein n is from 0 to 8.

The polyester film substrate is preferably a polyethylene terephthalate (PET) film or a polyethylene-2,6-naphthalate (PEN) film, more preferably a polyethylene terephthalate film. The PET or PEN polyester may optionally comprise, as one or more comonomer(s), relatively minor amounts, preferably less than 20% by weight, less than 10% by weight or less than 5% by weight, of one or more residues derived from other dicarboxylic acids and/or diols. Other dicarboxylic acids include isophthalic acid, phthalic acid, 1,4-, 2,5-, or 2,7-naphthalenedicarboxylic acid, 4,4'-diphenyldicarboxylic acid, hexahydroterephthalic acid, 1,10-decanedicarboxylic acid and aliphatic dicarboxylic acids of the general formula $C_nH_{2n}(COOH)_2$ wherein n is 2 to 8, such as succinic acid, glutaric acid sebacic acid, adipic acid, azelaic acid, suberic acid or pimelic acid. Other diols include aliphatic and cycloaliphatic glycols, such as diethylene glycol, propylene glycol, dipropylene glycol, 1,3-propanediol, 1,4-butane diol and 1,4-cyclohexanedimethanol. Preferably the polyester contains only one dicarboxylic acid, i.e. terephthalic acid or 2,6-naphthalene dicarboxylic acid, preferably terephthalic acid. Preferably the polyester contains only one diol, i.e. ethylene glycol.

The intrinsic viscosity of the polyester is preferably at least about 0.60 preferably at least about 0.65, preferably at least about 0.70, preferably at least about 0.75, and preferably at least about 0.80. Preferably, the intrinsic viscosity of the polyester is not more than 0.85, preferably not more than 0.83. The use of polyesters with a relatively high intrinsic viscosity provides improved hydrolysis stability, although too high a viscosity can lead to difficulties in film manufacture and/or require specialised, more robust film-forming equipment. For instance, increasing the viscosity too greatly may mean that it is appropriate to reduce output (i.e. reduce the amount of PET extruded per unit time, which leads to a less economical process) or to increase the extrusion temperature in order to reduce the viscosity of the melt (which in turn can lead to thermal degradation of the polymer and the loss of associated properties) in order to achieve stable film production.

Formation of the polyester is conveniently effected in a known manner by condensation or ester interchange, generally at temperatures up to about 295° C. In a preferred embodiment, solid state polymerisation may be used to increase the intrinsic viscosity to the desired value, using conventional techniques well-known in the art, for instance using a fluidised bed such as a nitrogen fluidised bed or a vacuum fluidised bed using a rotary vacuum drier.

The polyester is the major component of the polyester film substrate, and makes up at least 50%, preferably at least 60%, more preferably at least 70%, and preferably at least 80% by weight of the total weight of the polyester film substrate. For example, the polyester may make up at least 85%, at least 90% or at least 95% by weight of the total weight of the polyester film substrate.

The polyester layer film substrate may further comprise any other additive conventionally employed in the manufacture of polyester films. Thus, additives such as UV absorbers, antioxidants, hydrolysis stabilisers, fillers, cross-linking agents, dyes, pigments, voiding agents, lubricants, radical scavengers, thermal stabilisers, flame retardants and inhibitors, anti-blocking agents, surface active agents, slip aids, gloss improvers, prodegradents, viscosity modifiers and dispersion stabilisers may be incorporated as appropriate. Such components may be introduced into the polymer in a conventional manner. For example, by mixing with the monomeric reactants from which the polyester is derived, or the components may be mixed with the polymer by tumble or dry blending or by compounding in an extruder, followed by cooling and, usually, comminution into granules or chips.

In a preferred embodiment, the polyester film substrate is optically clear or translucent. As used herein, the term "optically clear" refers to a film that provides a percentage of scattered light in the visible wavelength range of no more than 30%, preferably no more than 15% preferably no more than 10%, preferably no more than 6%, more preferably no more than 3.5% and particularly no more than 1.5%, and/or a total luminous transmission (TLT) for light in the visible region (400 nm to 700 nm) of at least 80%, preferably at least 85%, more preferably at least about 90%. As used herein, the term "translucent" refers to a film having a TLT of at least 50%, preferably at least 60%, and preferably at least 70%.

Formation of the polyester film may be effected by conventional extrusion techniques well-known in the art. In general terms the process comprises the step of extruding polyester compositions through a die, usually at a temperature within the range of from about 280° C. to about 300° C., followed by quenching the extrudate and orienting the quenched extrudate.

Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation. In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature (Tg) of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the Tg of the polyester, preferably about 15° C. higher than the Tg. Greater draw ratios (for example, up to about 8 times) may be used if orientation in only one direction is required. It is not necessary to stretch equally in the machine and transverse directions although this is preferred if balanced properties are desired.

The stretched film may be, and preferably is, dimensionally stabilised by heat-setting under dimensional support at a temperature above the glass transition temperature of the polyester but below the melting temperature thereof, to induce the desired crystallisation of the polyester. The actual heat-setting temperature and time will vary depending on the composition of the film and its desired final thermal shrinkage but should not be selected so as to substantially degrade the toughness properties of the film such as tear resistance. During the heat-setting, a small amount of dimensional relaxation may be performed in the TD by a procedure known as "toe-in". Toe-in can involve dimensional shrinkage of the order 2% to 4% but an analogous dimensional relaxation in the MD is difficult to achieve since low line tensions are required and film control and winding becomes problematic.

The film may be further stabilized through use of an in-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 kg/m to about 2.5 kg/m, and typically in the range of 1.5 kg/m to 2 kg/m of film width. For a relaxation process which controls the film speed, the reduction in film speed (and therefore the strain relaxation) is typically in the range 0% to 2.5%, preferably 0.5% to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135° C. to 250° C. is generally desirable, preferably 150° C. to 230° C., more preferably 170° C. to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

The polyester film substrate preferably has a thermal shrinkage after being held at a temperature of 150° C. for 30 minutes in the machine direction in the range from about 0.1% to 5%, preferably 0.3% to 1.5%. The polyester film substrate preferably has a thermal shrinkage after being held at a temperature of 150° C. for 30 minutes in the transverse direction in the range from 0% to about 5%, preferably 0.1% to 1.2%. In an alternative preferred embodiment, particularly wherein the polyester film substrate is a heat-stabilised film (as described herein), the thermal shrinkage of the film after being held at a temperature of 150° C. for 30 minutes is in the range from about 0.01% to 1%, preferably from 0.05% to 0.5% and more preferably no more than 0.10% in the machine direction, and preferably no more than 0.10% and more preferably no more than 0.05% in the transverse direction.

The thickness of the polyester film substrate is preferably in the range of from about 5 µm to about 500 µm. Preferably the thickness is no more than about 250 µm, more preferably no more than about 150 µm, and most preferably no more than about 125 µm. Preferably the thickness is at least about 12 µm, more preferably at least about 15 µm, still more preferably at least about 20 µm, and most preferably at least about 25 µm.

The coating is derived from a coating composition comprising (i) a melamine crosslinker component; and (ii) a polyurethane component as described herein, which is preferably an aqueous solution/dispersion of the melamine crosslinker component (i) and the polyurethane component (ii).

The coating composition preferably has a solids content of at least 20% by weight, preferably at least 30% by weight, preferably at least 40% by weight, more preferably at least 50% by weight, for example at least 60% by weight, at least 70% by weight, or at least 80% by weight.

As used herein, the term "melamine crosslinker component" refers to one or more derivatives of melamine (1,3,5-triazine-2,4,6-triamine) in which the amino groups are functionalised with reactive functional groups which are capable of undergoing crosslinking reactions through the action of heat and/or an acidic catalyst.

A preferred melamine crosslinker component comprises one or more monomeric derivatives of melamine in which some or all of the amine groups are functionalised with alkoxymethyl or hydroxymethyl groups and/or oligomers (for example dimers, trimers and tetramers) derived from such monomeric melamine derivatives. These derivatives of melamine may suitably be obtained by reaction of melamine with formaldehyde, followed by alkylation of some or all of the resulting methylol groups with an alcohol. In general, the melamine crosslinker component (i) will contain a statistical mixture of different melamine derivatives, as determined by the formaldehyde and alkylation stoichiometries.

Preferred melamine crosslinker components have a formaldehyde stoichiometry (defined as the number of formaldehyde equivalents per molecule of melamine) of at least 3. For example, the formaldehyde stoichiometry may be in the range of from 3 to 4.5, preferably 3.3 to 4.3, preferably 3.3 to 4.1, indicating a melamine crosslinker component with a relatively high imine content. Alternatively, the formaldehyde stoichiometry may be greater than 4.5, preferably at least 5, preferably at least 5.5, indicating a melamine crosslinker component with a relatively low imine content. Further preferred melamine crosslinker components have a formaldehyde stoichiometry of at least 5.5, for example at least 5.8 or at least 5.9.

Further preferred melamine crosslinker components have an alkylation stoichiometry (defined as the number of alkylated methylol groups per molecule of melamine) of at least 1. For example the alkylation stoichiometry may be at least 2, at least 3, at least 4 or at least 5. It will be understood that the alkylation stoichiometry may not be greater than the formaldehyde stoichiometry.

Examples of preferred melamine crosslinker components include those having a formaldehyde stoichiometry of from 3.0 to 4.5, preferably 3.3 to 4.3, preferably 3.3 to 4.1 and an alkylation stoichiometry of from 1.0 to 3.2, preferably 1.5 to 3.0.

Further examples of preferred melamine crosslinker components include those having a formaldehyde stoichiometry of greater than 4.5, preferably at least 5, preferably at least 5.5 and an alkylation stoichiometry of from 3.5 to 5.9, preferably 4.0 to 5.9, preferably 4.5 to 5.9.

The alkylated methylol groups are preferably selected from $C_1$ to $C_4$ alkoxymethyl groups, more preferably from methoxymethyl groups or n-butoxymethyl groups, and most preferably the alkylated methylol groups are methoxymethyl groups. Thus, the alcohol used to alkylate the methylol groups is preferably selected from $C_1$ to $C_4$ alcohols, more preferably methanol or n-butanol, and most preferably methanol.

A particularly preferred constituent of the melamine crosslinker component (i) is hexamethoxymethylmelamine, i.e. melamine in which each amine group is functionalised by two methoxymethyl groups.

Suitable sources of the melamine crosslinker component (i) are CYMEL® 303, CYMEL® 350 and CYMEL® 385, available from Cytec Industries.

The term "polyurethane component" as used herein refers to a polyurethane derivable from one or more diisocyanates and one or more polymeric polyols.

Examples of suitable diisocyanates include those having the general formula O=C=N—$R^1$—N=C=O, wherein $R^1$ represents an aliphatic or aromatic hydrocarbyl group comprising from 2 to 16 carbon atoms. Examples of suitable aromatic diisocyanates include toluene-2,4-diisocyanate, toluene-2,6-diisocyanate, methylenediphenyl-4,4'-diisocyanate, methylenediphenyl-2,4'-diisocyanate and methylenediphenyl-2,2'-diisocyanate. The methylenediphenyldiisocyanates and the toluene-diisocyanates may also be used as mixtures of isomers.

Preferably, the polyurethane is derivable from an aliphatic diisocyanate. Examples of suitable aliphatic diisocyanates include hexamethylenediisocyanate (HDI), dicyclohexylmethane-4,4'-diisocyanate ($H_{12}$MDI; as a single isomer selected from the 4,4'-, 2,4'- and 2,2'-isomers, or as a mixture of isomers) and isophoronediisocyanate (1-isocyanato-3-isocyanatomethyl-3,5,5-trimethyl-cyclohexane; IPDI). Preferably, the aliphatic diisocyanate is selected from HDI and IPDI.

Suitable polymeric polyols include those having from 2 to 8 reactive hydroxyl groups, for example from 2 to 4 reactive hydroxyl groups, for example 2 reactive hydroxyl groups.

Suitable polymeric polyols include those having a weight average molecular weight of from 200 to 8,000, for example from 500 to 5,000, for example from 1,000 to 3,000.

Suitable polymeric polyols include polyether polyols, polyester polyols, polyacrylate polyols and polycarbonate polyols.

The term polyether polyol as used herein refers to a hydroxyl-substituted polymer obtainable via the ring-opening polymerisation of one or more cyclic ethers. Examples of suitable cyclic ethers include ethylene oxide, propylene oxide and tetrahydrofuran. Preferably, the polyether polyol is polypropylene oxide, polyethylene oxide, or a random, block or capped copolymer of ethylene oxide and propylene oxide.

The preparation of polyether polyols via the ring-opening polymerisation of one or more cyclic ethers is usually initiated by one or more polyfunctional initiators. Suitable initiators include polyols and polyamines. The initiator may be selected so as to control the functionality (i.e. the number of reactive hydroxyl groups) of the polyether polyol that is produced. If the ring-opening polymerisation is initiated by a diol, the resulting polyether has a functionality of 2. Other initiators may be selected to provide polyether polyols having higher functionality, for example up to 8. Suitable diols include ethylene glycol, propylene glycol, 1,3-propanediol, 1,4-butane diol and 1,4-cyclohexanedimethanol. Initiators providing polyethers of higher functionality include glycerol, trimethylolpropane and triethanolamine (to provide a functionality of 3), pentaerythritol and ethylenediamine (to provide a functionality of 4), diethylenetriamine (to provide a functionality of 5), sorbitol (to provide a functionality of 6), and sucrose (to provide a functionality of 6).

Suitable polyether polyols have from to 2 to 8 reactive hydroxyl groups, for example from 2 to 4 reactive hydroxyl groups, for example 2 reactive hydroxyl groups, and/or a weight average molecular weight of from 200 to 8,000, for example from 500 to 5,000, for example from 1,000 to 3,000.

Preferred polyether polyols include polyethylene glycols and polypropylene glycols having a weight average molecular weight of from 500 to 5,000, or from 1,000 to 3,000 and containing from 2 to 4, preferably 2, reactive hydroxyl groups.

The term polyester polyol as used herein refers to a linear or branched polyester with terminal hydroxyl groups. Suitable polyesters may be obtained via the condensation of one or more dicarboxylic acids and one or more diols, or via the ring-opening polymerisation of a lactone. Examples of suitable dicarboxylic acids are $C_2$ to $C_8$ aliphatic or aromatic dicarboxylic acids, such as oxalic acid, malonic acid, succinic acid, maleic acid, fumaric acid, adipic acid, phthalic acid, isophthalic acid and terephthalic acid. Preferred dicarboxylic acids are aliphatic dicarboxylic acids, in particular adipic acid. Examples of suitable diols include ethylene glycol, diethylene glycol, propylene glycol, dipropylene glycol, 1,3-propanediol, 1,4-butane diol, 1,6-hexanediol and 1,4-cyclohexanedimethanol. The functionality of polyester polyols may optionally be increased by including one or more polyols having a functionality of 3 or above, such as glycerol, trimethylolpropane, triethanolamine, and pentaerythritol.

Suitable condensation polyester polyols include those having from to 2 to 8 reactive hydroxyl groups, for example from 2 to 4 reactive hydroxyl groups, for example 2 reactive hydroxyl groups, and/or a weight average molecular weight of from 200 to 8,000, for example from 500 to 5,000, for example from 1,000 to 3,000.

Preferred condensation polyester polyols include ethylene glycol adipates and diethylene glycol adipates having a weight average molecular weight of from 500 to 5,000, or from 1,000 to 3,000 and containing on average from 2 to 4, preferably 2, reactive hydroxyl groups.

Examples of suitable lactones include β-propiolactone, γ-butyrolactone, δ-valerolactone, and ε-caprolactone. A preferred lactone is ε-caprolactone. As with polyether polyols, the ring opening polymerisation of lactones may suitably be initiated by one or more polyfunctional initiators, which are preferably polyol initiators. Suitable polyol initiators may be selected according to the functionality of the polyester polyol that is required, and suitable initiators include ethylene glycol, propylene glycol, 1,3-propanediol, 1,4-butane diol, 1,4-cyclohexanedimethanol, glycerol, trimethylolpropane, triethanolamine, and pentaerythritol.

Suitable ring-opening polyether polyols include those having from 2 to 4 reactive hydroxyl groups, for example 2 reactive hydroxyl groups, and/or a weight average molecular weight of from 200 to 8,000, for example from 500 to 5,000, for example from 1,000 to 3,000.

Preferred ring-opening polyester polyols include polycaprolactones having a weight average molecular weight of from 500 to 5,000, or from 1,000 to 3,000 and containing from 2 to 4, preferably 2, reactive hydroxyl groups.

The term polycarbonate polyol as used herein refers to a linear or branched polycarbonate with terminal hydroxyl groups. Suitable polycarbonates may be obtained via the reaction of a diol with phosgene or a phosgene synthetic equivalent. Examples of suitable diols include aliphatic diols, such as ethylene glycol, diethylene glycol, propylene glycol, dipropylene glycol, 1,3-propanediol, 1,4-butane diol, 1,6-hexanediol and 1,4-cyclohexanedimethanol. Suitable diols also include aromatic diols, such as benzene-1,4-diol and the members of the group of bisphenols [such as methylenediphenyl-4,4'-diol (also known as bisphenol-F), and 4,4'-(propane-2,2-diyl)diphenol (also known as bisphenol-A)]. The functionality of polycarbonate polyols may optionally be increased by including one or more polyols having a functionality of 3 or above, such as glycerol, trimethylolpropane, triethanolamine, and pentaerythritol.

Suitable polycarbonate polyols include those containing on average from 2 to 8 reactive hydroxyl groups, for example 2 to 4 reactive hydroxyl groups, for example 2 reactive hydroxyl groups, and/or having a weight average molecular weight of from 200 to 8,000, for example from 500 to 5,000, for example from 1,000 to 3,000.

Preferred polycarbonate polyols include aromatic polycarbonates, preferably derived from benzene-1,4-diol or bisphenol-A, and having a weight average molecular weight of from 500 to 5,000, or from 1,000 to 3,000 and containing on average from 2 to 4, preferably 2, reactive hydroxyl groups.

The term polyacrylate polyol as used herein refers to polymers obtainable by the addition polymerisation of a hydroxyl-substituted acrylate monomer with one or more, preferably two or more ethylenically unsaturated comonomers. Suitable hydroxyl-substituted acrylate monomers include 2-hydroxyethylacrylate and 2-hydroxyethylmethacrylate. Suitable ethylenically unsaturated comonomers include methylacrylate, ethylacrylate, butylacrylate, methylmethacrylate, ethylmethacrylate, butylmethacrylate and styrene.

Suitable polyacrylate polyols include those containing on average from 2 to 8 reactive hydroxyl groups, for example 2 to 4 reactive hydroxyl groups, for example 2 reactive hydroxyl groups, and/or having a weight average molecular weight of from 200 to 8,000, for example from 500 to 5,000, for example from 1,000 to 3,000.

Preferred polyacrylate polyols include those derived from 2-hydroxyethylacrylate or 2-hydroxyethylmethacrylate and at least one of methylacrylate, ethylacrylate, methylmethacrylate and ethylmethacrylate, having a weight average molecular weight of from 500 to 5,000, or from 1,000 to 3,000, and containing on average from 2 to 4, preferably 2, reactive hydroxyl groups.

In preferred embodiments, the polyurethane component further comprises residues derived from one or more low molecular weight diols, referred to in the art as "chain extenders". The chain extenders react with the diisocyanate to form a rigid or 'hard' sequence known as a 'hard block'. Isocyanate-capped hard block precursors can be reacted with the polymeric polyols (known as 'soft blocks') described above to form a segmented block copolymer having alternating rigid and flexible segments. Polyurethanes of this type are known in the art as "polyurethane elastomers".

Suitable diols for use as chain extenders include $C_1$ to $C_6$ diols and dimers thereof, such as ethylene glycol, diethylene glycol, propylene glycol, dipropylene glycol, 1,3-propanediol, 1,4-butane diol and 1,4-cyclohexanedimethanol. Preferred chain extenders are ethylene glycol and butane-1,4-diol. Chain extenders may suitably be present in the polyurethane in an amount of from 1 to 40 wt % for example from 2 to 20 wt %, for example 3 to 15 wt %, based on the weight of the chain extender diol.

Preferably, the polyurethane is derivable from a diisocyanate and one or more polycarbonate polyols. More preferably, the polyurethane is derivable from an aliphatic diisocyanate and one or more polycarbonate polyols.

Suitable sources of the polyurethane component (ii) are ALBERDINGK® UC84 and UC90, available from Alberdingk Boley GmbH.

The coating preferably has a dry thickness (i.e. the thickness of the coating in the finished film) of no more than 5.0 µm, preferably no more than 2.0 µm and more preferably no more than 1.5 µm. In further preferred embodiments, the coating may have a thickness of no more than 1.0 µm, no more than 0.8 µm or no more than 0.5 µm.

The coating preferably has a dry thickness (i.e. the thickness of the coating in the finished film) of at least 200 nm, more preferably at least 250 nm, more preferably at least 300 nm, more preferably at least 350 nm, more preferably at least 400 nm, more preferably at least 500 nm, more preferably at least 600 nm, more preferably at least 800 nm, or most preferably at least 1000 nm.

For example, the coating preferably has a dry thickness (i.e. the thickness of the coating in the finished film) of between 200 nm and 5 µm, more preferably between 250 nm and 5 µm, more preferably between 300 nm and 5 µm, more preferably between 350 nm and 5 µm, more preferably between 400 nm and 5 µm, more preferably between 500 nm and 5 µm, more preferably between 500 nm and 2 µm, more preferably between 600 nm and 2 µm, more preferably between 800 nm and 2 µm, or most preferably between 1 µm and 2 µm. In preferred embodiments, the coated polyester film does not comprise a primer layer between the polyester film substrate and the coating derived from a coating composition comprising: (i) a melamine crosslinker component; and (ii) a polyurethane component derivable from at least one diisocyanate and at least one polymeric polyol.

In a preferred embodiment, the coated polyester film of the invention is optically clear or translucent, wherein the term "optically clear" refers to a film that provides a percentage of scattered light in the visible wavelength range of no more than 30%, preferably no more than 15% preferably no more than 10%, preferably no more than 6%, more preferably no more than 3.5% and particularly no more than 1.5%, and/or a total luminous transmission (TLT) for light in the visible region (400 nm to 700 nm) of at least 80%, preferably at least 85%, more preferably at least about 90%. As used herein, the term "translucent" refers to a film having a TLT of at least 50%, preferably at least 60%, and preferably at least 70%.

The abrasion resistance of the coated polyester film is preferably assessed using the Taber abraser test, according to ASTM D-1044. Taber abrasion testing involves mounting a specimen to a turntable platform that rotates at a fixed speed. Two abrasive wheels, are lowered onto the specimen surface. As the turntable rotates, the wheels are driven by the sample in opposite directions about a horizontal axis displaced tangentially from the axis of the sample. One abrading wheel rubs the specimen outward toward the periphery and the other, inward toward the centre while a vacuum system removes loose debris during testing.

A characteristic rub-wear action (sliding rotation) is produced on the surface of the test piece and the resulting abrasion marks form a pattern of crossed arcs in a circular band that cover an area of 30 $cm^2$. An important feature of this instrument is that the wheels traverse a complete circle on the specimen surface, revealing abrasion resistance at all angles relative to the weave or grain of the material. The degree of abrasion may be monitored by measuring the increase in haze (referred to as "Taber haze") over the course of the test.

In the standard ASTM D-1044 test, the abrasive wheels are applied at 500 g load and the test continues for 100 cycles.

It has been found that the coated polyester films of the present invention when tested under this modified Taber abraser test demonstrate an increase in Taber haze of no more than 10%, preferably no more than 8% and most preferably no more than 5%.

The term "improved flexibility" is used herein to refer to a coated polyester substrate which has a greater resistance to cracking of the coating upon application of a strain when compared to a substrate coated with a corresponding coating derived from the melamine crosslinker component (i) only.

The coated polyester films of the present invention preferably exhibit improved flexibility such that the crack onset strain of the coated polyester film, determined according to the procedure defined below, is about 5% or more, preferably about 10% or more, preferably about 15% or more, preferably about 20% or more, preferably about 25% or more, preferably about 30% or more of the original dimension of the coated polyester film.

The coated polyester films of the present invention preferably exhibit improved flexibility such that the number of cracks in the coating at 25% elongation in the transverse direction, determined according to the procedure defined below, is 25 or less, preferably 20 or less, preferably 15 or less, preferably 10 or less, preferably 5 or less, preferably 2 or less, and most preferably 0.

Preferably, the coating is formed directly on the polyester substrate, although it is not excluded that a primer layer may be used between the polyester film substrate and the coating.

The coated polyester films of the invention may be obtained by applying a coating composition (preferably an aqueous coating composition) comprising a solution/dispersion of the melamine crosslinker component (i) and the polyurethane component (ii) to one or both surfaces of the polyester film substrate, drying the coating composition and curing the coating composition by heating.

In one embodiment, the coated polyester films of the present invention comprise a coating as defined above on one surface of the polyester film substrate.

In another embodiment, the coated polyester films of the present invention comprise a coating as defined above on both surfaces of the polyester film substrate.

In a further embodiment, the coating is provided on one surface of the polyester film substrate, and the surface of the polyester film substrate opposite the coating is provided with a layer of a suitable adhesive as known in the art. Preferably a release liner is disposed over the adhesive layer, the release liner having a release surface, such as a silicone or fluorochemical surface, that allows the release liner to be removed by an end user prior to application of the adhesive layer to a suitable substrate, such as a graphic display device.

According to another aspect of the invention, there is provided a method of manufacturing a coated polyester film comprising:
(a) disposing a coating composition comprising a solution or dispersion of (i) a melamine crosslinker component; and (ii) a polyurethane component derivable from at least one diisocyanate and at least one polymeric polyol in a liquid vehicle (preferably an aqueous liquid vehicle) on at least one surface of a polyester film substrate;
(b) drying the coating composition; and
(c) curing the dried coating composition by heating.

In accordance with this aspect of the invention, the melamine crosslinker component (i) and the polyurethane component (ii) taken together preferably constitute at least 80% by weight of the dried coating composition, for example at least 90% by weight of the dried coating composition, at least 95% by weight of the dried coating composition, at least 98% by weight of the dried coating composition, or at least 99% by weight of the dried coating composition. The dried coating composition may consist essentially of the melamine crosslinker component (i) and the polyurethane component (ii).

In a preferred embodiment, the weight ratio of the melamine crosslinker component (i) to the polyurethane component (ii) is from 30:70 to 99:1. In further embodiments, the weight ratio of the melamine crosslinker component (i) to the polyurethane component (ii) is from 40:60 to 95:5, for example from 50:50 to 90:10, or from 55:45 to 85:15, or from 60:40 to 80:20.

For example, the weight ratio of the polyurethane component (ii) relative to the melamine crosslinker component (i) may be 1% to 160%, more preferably 1% to 150%, more preferably 1% to 140%, more preferably 1% to 130%, more preferably 1% to 120%, more preferably 1% to 110%, more preferably 1% to 100%, more preferably 5% to 100%, more preferably 10% to 90%, more preferably 15% to 75% or most preferably 20% to 50%.

Preferred polyester film substrates, melamine crosslinker components (i) and polyurethane components (ii) are as described above.

The coating composition may optionally contain minor amounts of one or more additives, such as surfactants and hardeners. Typically, a surfactant will be present in an amount of no more than 1.0% by weight, preferably no more than 0.5% by weight, for example 0.2% by weight or 0.1% by weight of the dispersion. Typically, a hardener will be present in an amount of from 0.1% to 1.0% by weight, for example from 0.2% to 0.5% by weight, based on the total solids content of the dispersion.

The coating composition may be coated onto the polyester film substrate using any suitable coating technique, including gravure roll coating, reverse roll coating, dip coating, bead coating, extrusion-coating, melt-coating or electrostatic spray coating. Any coating step preferably avoids the use of organic solvent.

The coating composition is preferably applied at a wet-coat thickness to provide a dry thickness of no more than 5.0 µm, preferably no more than 2.0 µm and more preferably no more than 1.5 µm. In further preferred embodiments, the coating composition is applied at a dry thickness of no more than 1.0 µm, no more than 0.8 µm or no more than 0.5 µm.

The coating composition is preferably applied at a wet-coat thickness to provide a dry thickness of at least 200 nm, more preferably at least 250 nm, more preferably at least 300 nm, more preferably at least 350 nm, more preferably at least 400 nm, more preferably at least 500 nm, more preferably at least 600 nm, more preferably at least 800 nm, or most preferably at least 1000 nm.

For example, the coating composition is preferably applied at a wet-coat thickness to provide a dry thickness of between 200 nm and 5 µm, more preferably between 250 nm and 5 µm, more preferably between 300 nm and 5 µm, more preferably between 350 nm and 5 µm, more preferably between 400 nm and 5 µm, more preferably between 500 nm and 5 µm, more preferably between 500 nm and 2 µm, more preferably between 600 nm and 2 µm, more preferably between 800 nm and 2 µm, or most preferably between 1 µm and 2 µm. The coating composition is suitably dried in an oven at a temperature of from about 100° C. to about 150° C., preferably from about 120° C. to about 140° C.

The dried coating composition is suitably cured in an oven at a temperature of from about 150° C. to about 250° C., preferably about 190° C. to about 250° C., more preferably about 200° C. to about 230° C., and most preferably about 215° C. to about 230° C.

It will be appreciated that the drying and curing steps may be conducted separately and sequentially, or may be combined into a single heat-treatment comprising the appropriate heating profile.

In one embodiment, the coating composition is disposed on one surface of the polyester film substrate.

In another embodiment, the coating composition is disposed on both surfaces of the polyester substrate.

The coating composition may be disposed on the at least one surface of the polyester film in step (a) either "in-line" (i.e. wherein the coating step takes place during film manufacture and before, during or between any stretching operation(s) employed) or "off-line" (i.e. after film manufacture). Preferably, step (a) is conducted in-line.

In a preferred embodiment, the polyester film substrate of the coated polyester film is biaxially oriented and the coating composition is applied to the polyester film substrate by an in-line process during manufacture of the polyester film substrate.

In a preferred embodiment, the method of manufacturing a coated polyester film does not comprise applying a primer layer onto the at least one surface of the polyester film substrate before disposing the coating composition comprising a solution or dispersion of (i) a melamine crosslinker component; and (ii) a polyurethane component derivable from at least one diisocyanate and at least one polymeric polyol in a liquid vehicle (preferably an aqueous liquid vehicle) on the at least one surface of a polyester film substrate.

More preferably, the coated polyester film is obtained by applying the coating composition inline between the first and second stretching steps during manufacture of the biaxially oriented polyester film substrate. Thus, a flat, quenched polyester extrudate is stretched initially in the machine direction and the coating composition is then applied to the uniaxially stretched extrudate. The liquid vehicle (i.e. water in the case of an aqueous coating composition) is removed from the coating composition as the film enters the stenter oven and the film is then stretched in the transverse direction.

Stretching of the polyester film substrate in the transverse direction is preferably effected at a temperature above the Tg of the of the polyester, preferably about 15° C. higher than the Tg, but not at so high a temperature that rapid curing of the coating occurs before the stretching operation has been completed. Preferably, transverse stretching of the polyester film substrate takes place simultaneously with drying of the coating composition, and more preferably at a temperature of from about 100° C. to about 150° C., preferably from about 120° C. to about 140° C.

Heat-setting of the film preferably takes place simultaneously with curing of the coating, and more preferably at a temperature in the range of from 150° C. to 250° C., preferably 190° C. to 250° C., more preferably 200° C. to 230° C., and most preferably 215° C. to 230° C., and for a heating duration typically in the range of from 10 to 40 seconds, and preferably 20 to 30 seconds.

The exposed surface of the polyester film substrate may, if desired, be subjected to a chemical or physical surface-modifying treatment to improve the bond between the polyester surface and the coating. For example, the exposed surface of the substrate can be exposed to a high voltage electrical stress accompanied by corona discharge. Corona discharge may be effected in air at atmospheric pressure with conventional equipment using a high frequency, high voltage generator, preferably having a power output of from 1 to 20 kW at a potential of 1 to 100 kV. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface. Typically, however, no such surface-modifying treatment is effected, and the coating composition described above is coated directly onto the surface of the substrate.

One limitation of the use of aqueous coating compositions for in-line coating operations is that the need to dry the coated compositions limits the speed at which the film production line can be operated, which can reduce the commercial viability of the operation. The process of the present invention has the advantage that the aqueous coating compositions can be applied at relatively high solids content without detriment to the properties of the coated polyester film produced. Consequently, water can be driven off from the coatings after application more quickly and efficiently, allowing operation of the film production line at commercially viable speed.

Thus, the preferred aqueous coating compositions have a solids content of at least 20% by weight, preferably at least 30% by weight, preferably at least 40% by weight, more preferably at least 50% by weight, for example at least 60% by weight, at least 70% by weight, or at least 80% by weight.

The aqueous coating compositions described herein are preferably applied to provide a dry thickness of the coating of no more than 5.0 μm, preferably no more than 2.0 μm, preferably no more than 1.5 μm, preferably no more than 1.0 μm, for example no more than 0.8 μm, or no more than 0.5 μm. Coating thicknesses in these ranges are particularly advantageous for in-line operation, particularly using high solids aqueous coating compositions as defined above, so as to avoid the need to reduce the operating velocity the film production line.

In another aspect, the present invention provides a method of improving the flexibility of a crosslinked melamine resin coating disposed on a polyester film substrate, the method comprising incorporating a polyurethane component derivable from at least one diisocyanate and at least one polymeric polyol into the crosslinked melamine resin coating.

In another aspect, the present invention provides a method of improving the abrasion resistance of a polyester film substrate, the method comprising:
(a) disposing a coating composition comprising a solution or dispersion of (i) a melamine crosslinker component; and (ii) a polyurethane component derivable from at least one diisocyanate and at least one polymeric polyol in a liquid vehicle (preferably an aqueous liquid vehicle) on at least one surface of a polyester film substrate;
(b) drying the coating composition; and
(c) curing the dried coating composition by heating.

In accordance with this aspect of the invention, the coating composition and/or the coated polyester film obtained and/or the method of improving the abrasion resistance may include any of the preferred features disclosed herein with reference to the preceding aspects of the invention.

In a further aspect, the present invention provides the use of a polyurethane component as defined herein to improve the flexibility of a crosslinked melamine coating for a polyester film substrate.

In accordance with this aspect of the invention, the crosslinked melamine coating and/or the coated polyester film and/or the method by which the coated polyester film is obtained may include any of the preferred features disclosed herein with reference to the preceding aspects of the invention.

In a further aspect the present invention provides the use of a coating composition comprising (i) a melamine crosslinker component and (ii) a polyurethane component derivable from at least one diisocyanate and at least one polymeric polyol to improve the abrasion resistance of a polyester film substrate.

In accordance with this aspect of the invention, the coating composition and/or the coated polyester film and/or the method by which the coated polyester film is obtained may include any of the preferred features disclosed herein with reference to the preceding aspects of the invention.

The improved abrasion resistance provided by the present invention may be useful during processing of the coated polyester films, for instance to reduce or eliminate the formation of scratches during roller contact in roll-to-roll processing, and/or during operations such as winding and slitting of the film to required dimensions.

The improved abrasion resistance provided by the present invention may be useful during end use of the coated polyester films, for instance as an external surface of a consumer device, such as a touchscreen graphic display device.

In a further aspect, there is provided an electronic or opto-electronic device comprising a coated polyester film as defined above or prepared according to the method defined above. The coated polyester film may be disposed on an external surface of the electronic or opto-electronic device or may form an internal layer of the electronic or opto-electronic device.

Electronic devices within this aspect of the invention include graphic display devices and photovoltaic cells. For example the electronic device may be a graphic display device, wherein a coated polyester film as defined above or prepared according to the method defined above is disposed on a viewing surface of the graphic display device. Alternatively, the electronic device may be a graphic display device, wherein a coated polyester film as defined above or prepared according to the method defined above forms an internal layer of the graphic display device.

Examples of graphic display devices include touch screen devices, such as smart phones or tablet computers. Preferably, the coated polyester film as defined above is disposed such that the coating is disposed on the side of the polyester film opposite the viewing surface of the graphic display device.

For the avoidance of doubt, preferred embodiments described herein with reference to any one aspect of the invention shall be understood as being preferred aspects of all aspects of the invention. Thus, preferred polyester substrates, melamine crosslinker components, polyurethane components, or any other preferred features of the coated polyester films described above and the methods of manufacturing the same shall be understood to apply to all aspects of the invention.

Property Measurement

The following analyses were used to characterize the films described herein:

(i) Clarity was evaluated by measuring total luminance transmission (TLT) and haze (% of scattered transmitted visible light) through the total thickness of the film using an M57D spherical hazemeter (Diffusion Systems) according to the standard test method ASTM D1003.

(ii) Intrinsic Viscosity (in units of dL/g) of the polyester and polyester film was measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln \eta_{rel})/c$$

wherein:
$\eta$=the intrinsic viscosity (in dL/g),
$\eta_{rel}$=the relative viscosity,
c=the concentration (in g/dL), and
$\eta_{red}$=reduced viscosity (in dL/g), which is equivalent to $(\eta_{rel}-1)/c$ (also expressed as $\eta_{sp}/c$ where $\eta_{sp}$ is the specific viscosity).

(iii) Crack onset strain was measured from strips of film 100 mm long (transverse direction (MD)) by 10 mm wide (machine direction (TD)). Using an Instron machine, the samples are elongated once in the transverse direction over a range of elongation % values from 5% to 40% of their original dimensions in 5% increments and at a draw rate of 25 mm/min. The starting length between clamps is 80 mm. The inspection for cracks is carried out by firstly determining the midway line between the ends of the strip after elongation and marking out a line 5 mm on either side of this line. Within the resulting 10 mm×10 mm test zone of the elongated film strip a randomly selected area of 400 μm by 300 μm is inspected and the presence of cracks is determined under a magnification of 20. Results are reported either as (i) one or more cracks are present or (ii) no cracks are present. All cracks are counted, whether full or partial cracks. The test was repeated for four different strips of the same sample (i.e. 4 measurements per film coating) and a crack onset strain is reported which is the maximum elongation of the four strips at which no cracks were observed for any of the four strips.

(iv) The number of cracks in the coating at 25% elongation in the transverse direction was measured from strips of film 100 mm long (transverse direction (MD)) by 10 mm wide (machine direction (TD)). Using an Instron machine, the samples are elongated in the transverse direction by 25% of their original dimensions at a draw rate of 25 mm/min. The starting length between the Instron clamps is 80 mm. The resulting samples are then inspected for cracks in the coating by reflective microscopy using a Leica DMRX microscope. The inspection for cracks is carried out by firstly determining the midway distance point between the ends of the strip after elongation and marking out a line 5 mm either side of this point. Within this 10 mm by 10 mm test zone four random test areas of 400 μm by 300 μm of the film are inspected. The number of cracks in each test region is counted under a magnification of 20. The number of both full and partial cracks in the image are counted and reported. Results are reported as an average of four test areas per film repeated for four different strips (i.e. an average of 16 measurements per film coating).

(v) Taber Haze is measured using the Taber abraser test (ASTM D-1044) at 500 g loading over 100 cycles. A film having a Taber Haze value of less than 10 is considered suitable for commercial use, for instance for touchscreen applications.

The invention is further illustrated by the following examples. The examples are not intended to limit the invention as described above. Modification of detail may be made without departing from the scope of the invention.

EXAMPLES

Comparative Example 1 and Examples 2 to 6

In Comparative Example 1 and Examples 2 to 6, CYMEL® 385 from Cytec Industries was used as the melamine crosslinker component (i), and ALBERDINGK® UC84 was used as the polyurethane component (ii). CYMEL® 385 is an aqueous solution having a solids content of 80 wt % and ALBERDINGK® UC84 is an aqueous dispersion having a solids content of 35 wt %. CYMEL® 385 was diluted to a solids content of 50 wt % before use. TWEEN 20 was used as a surfactant and ammonium nitrate was used as a catalyst.

Coated films were prepared as follows:

Polyethylene terephthalate was melt extruded, cast onto a cooled rotating drum and stretched in the direction of extrusion to approximately 3 times its original dimensions at a temperature of 150° C. The film was coated on its upper surface with a coating composition as defined in Table 1 below in an amount sufficient to provide a final dry thickness of 1.0 μm. The coated film was passed into a stenter oven at a temperature of 120° C. where the film was dried and stretched in the transverse direction to approximately 3 times its original dimensions. The biaxially stretched film was heat set at a temperature of about 200° C. with simultaneous curing of the coating. The heat-set biaxially stretched film was then unwound and then further heat-stabilised in a roll-to-roll process by passing the film through an additional set of ovens, of which the maximum temperature was above 150° C., for a duration of no more than 2 seconds. The film was transported through the ovens under a low line tension, allowing it to relax and stabilize further. The final coated polyester film thickness was 100 μm, in which the final dry thickness of the coating was 1.0 μm on one side.

TABLE 1

| | CYMEL 385 (50 wt %) | UC 84 (35 wt %) | Water | TWEEN 20 (10 wt %) | Ammonium Nitrate (10 wt %) | Solids %[b] | PU %[c] |
|---|---|---|---|---|---|---|---|
| Comparative Example 1 | 2549.8[a] | 0 | 337.4 | 12.9 | 106.3 | 42.8 | 0 |
| Example 2 | 1821.3 | 260.0 | 194.0 | 10.1 | 75.91 | 42.8 | 10 |
| Example 3 | 1821.3 | 521.0 | 146.0 | 11.0 | 75.91 | 42.8 | 20 |
| Example 4 | 1821.3 | 781.0 | 97.0 | 12.0 | 75.91 | 42.8 | 30 |
| Example 5 | 1821.3 | 1040.0 | 49.0 | 12.8 | 75.91 | 42.8 | 40 |
| Example 6 | 1821.3 | 1302.0 | 0 | 13.7 | 75.91 | 42.8 | 50 |

[a]All values (except %) are in grams.
[b]Solids % defines the weight of solids in the aqueous coating composition relative to the total weight of the composition
[c]PU % defines the weight of the polyurethane component (UC 84) in the aqueous coating composition relative to the weight of the melamine crosslinker component (CYMEL 385)

The films of Comparative Example 1 and Examples 2 to 6 were tested for the number of cracks at 25% elongation, the crack onset strain and Taber Haze according to the protocols described above. The results are provided in Table 2 and in FIG. 1.

TABLE 2

| | Taber Haze % | Number of cracks at 25% elongation | Crack onset strain % | Optical Haze % |
|---|---|---|---|---|
| Comparative Example 1 | 5.5 | 26.7 | 5 | 0.85 |
| Example 2 | 5.6 | 22.2 | 10 | 0.74 |
| Example 3 | 6.3 | 13.6 | 15 | 0.81 |
| Example 4 | 4.8 | 2 | 15 | 0.87 |
| Example 5 | 5.8 | 0 | 25 | 0.80 |
| Example 6 | 6.2 | 0 | 30 | 0.85 |

The foregoing examples demonstrate that a significant improvement in the flexibility of the coated films is obtained by the inclusion of a polyurethane component (ii) with only a negligible increase in Taber Haze and little or no change in the clarity of the film as measured by the optical haze.

The invention claimed is:

1. An electronic or opto-electronic device comprising a coated polyester film comprising a polyester film substrate and a coating on at least one side of the polyester film substrate, wherein the coating is derived from a coating composition comprising: (i) a melamine crosslinker component; and (ii) a polyurethane component derivable from at least one diisocyanate and at least one polymeric polyol, wherein the melamine crosslinker component (i) and the polyurethane component (ii) taken together constitute at least 80% by weight of the solids in the coating composition, wherein the coating composition has a solids content of at least 20% by weight, and wherein the weight ratio of the polyurethane component (ii) relative to the melamine crosslinker component (i) is in the range of from 1% to 200%, and wherein said coated polyester film is disposed such that the coating layer defines an external surface of said electronic or opto-electronic device; wherein the coated polyester film substrate provides a percentage of scattered light in the wavelength range 400 nm to 700 nm of no more than 30% or a total luminous transmission for light in the wavelength range 400 nm to 700 nm of at least 80%, wherein the polyester film substrate is a polyethylene terephthalate film or a polyethylene-2,6-naphthalate film, and wherein the polyester film substrate has a thermal shrinkage after being held at a temperature of 150° for 30 minutes in the range of from about 0.1% to 5% in the machine direction and in the range from 0% to about 5% in the transverse direction.

2. The electronic or opto-electronic device according to claim 1, wherein the melamine crosslinker component (i)

and the polyurethane component (ii) taken together constitute at least 90% by weight of the solids in the coating composition.

3. The electronic or opto-electronic device according to claim 1, wherein the weight ratio of the polyurethane component (ii) relative to the melamine crosslinker component (i) is in the range of from 5% to 200%.

4. The electronic or opto-electronic device according to claim 1, wherein the weight ratio of the polyurethane component (ii) relative to the melamine crosslinker component (i) is in the range of 1% to 160%.

5. The electronic or opto-electronic device according to claim 1, wherein the polyester film substrate is biaxially oriented.

6. The electronic or opto-electronic device according to claim 1, wherein the polyester film substrate has a thickness in the range of from 5 µm to 500 µm.

7. The electronic or opto-electronic device according to claim 1, wherein the melamine crosslinker component (i) comprises one or more monomeric derivatives of melamine in which some or all of the amino groups are functionalised with alkoxymethyl or hydroxymethyl groups and/or oligomers derived from said monomeric melamine derivatives.

8. The electronic or opto-electronic device according to claim 7, wherein the melamine crosslinker component (i) has a formaldehyde stoichiometry of at least 3.

9. The electronic or opto-electronic device according to claim 7, wherein the melamine crosslinker component (i) has an alkylation stoichiometry of at least 1.

10. The electronic or opto-electronic device according to claim 7, wherein the alkoxymethyl groups are methoxymethyl groups.

11. The electronic or opto-electronic device according to claim 10, wherein the melamine crosslinker component (i) comprises hexamethoxymethylmelamine.

12. The electronic or opto-electronic device according to claim 1, wherein the at least one diisocyanate is an aliphatic diisocyanate.

13. The electronic or opto-electronic device according to claim 12, wherein the aliphatic diisocyanate is selected from hexamethylenediisocyanate and isophoronediisocyanate.

14. The electronic or opto-electronic device according to claim 1, wherein the at least one diisocyanate is an aromatic diisocyanate.

15. The electronic or opto-electronic device according to claim 14, wherein the aromatic diisocyanate is selected from methylenediphenyl-4,4'-diisocyanate, methylenediphenyl-2,4'-diisocyanate, methylenediphenyl-2,2'-diisocyanate, and mixtures thereof.

16. The electronic or opto-electronic device according to claim 1, wherein the at least one polymeric polyol has from 2 to 8 reactive hydroxyl groups.

17. The electronic or opto-electronic device according to claim 1, wherein the at least one polymeric polyol has a weight average molecular weight of from 200 to 8,000.

18. The electronic or opto-electronic device according to claim 1, wherein the at least one polymeric polyol is selected from polyester polyols, polyether polyols, polyacrylate polyols and polycarbonate polyols.

19. The electronic or opto-electronic device according to claim 18, wherein the at least one polymeric polyol is selected from polycarbonate polyols.

20. The electronic or opto-electronic device according to claim 1, wherein the polyurethane is a polyurethane elastomer.

21. The electronic or opto-electronic device according to claim 1, wherein the coating has a dry thickness of no more than 5.0 µm.

22. The electronic or opto-electronic device according to claim 1, wherein the coating has a dry thickness of at least 200 nm.

23. The electronic or opto-electronic device according to claim 1, wherein the coating has a dry thickness of between 200 nm and 5 µm.

24. The electronic or opto-electronic device according to claim 1, which exhibits an increase in Taber haze of no more than 10% when the coating is tested according to ASTM D-1044 wherein a loading of 500 g is used over 100 cycles.

25. The electronic or opto-electronic device according to claim 1, wherein the crack onset strain of the coated polyester film, determined according to the procedure set out in the description, is 5% or more of the original dimension of the coated polyester film.

26. The electronic or opto-electronic device according to claim 1, wherein the number of cracks in the coating at 25% elongation is 25 or less.

27. The electronic or opto-electronic device according to claim 1, wherein the coating is disposed directly on the polyester substrate.

28. The electronic or opto-electronic device according to claim 1 which is a graphic display device.

* * * * *